United States Patent
Ludwig et al.

(10) Patent No.: US 8,366,303 B2
(45) Date of Patent: Feb. 5, 2013

(54) LAMP RETAINER FOR CURTAIN SIDE AIRBAG DEPLOYMENT

(75) Inventors: Adam Michael Ludwig, Ann Arbor, MI (US); Jeff Charles Hills, Grand Rapids, MI (US); Jim Scheerhorn, Holland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 575 days.

(21) Appl. No.: 12/628,651

(22) Filed: Dec. 1, 2009

(65) Prior Publication Data

US 2011/0128749 A1    Jun. 2, 2011

(51) Int. Cl.
*F21V 21/14* (2006.01)
(52) U.S. Cl. .................. 362/490; 362/488; 362/489
(58) Field of Classification Search .......... 362/488–490
See application file for complete search history.

(56) References Cited

U.S. PATENT DOCUMENTS

| | | | |
|---|---|---|---|
| 4,893,867 A | 1/1990 | Hilborn et al. | |
| 5,101,540 A | 4/1992 | Roof et al. | |
| 5,130,911 A | 7/1992 | Eisner, Sr. | |
| 5,201,579 A | 4/1993 | Roof et al. | |
| 5,465,200 A | 11/1995 | Finocchio et al. | |
| 6,357,901 B1 | 3/2002 | Grossman et al. | |
| 6,773,151 B2 | 8/2004 | Brown | |
| 7,153,171 B1 | 12/2006 | Goto | |
| 7,261,450 B2 | 8/2007 | Tiesler | |
| 7,311,426 B2 * | 12/2007 | Tiesler et al. | ................. 362/488 |
| 2006/0061128 A1 | 3/2006 | Hall | |

* cited by examiner

*Primary Examiner* — Anabel Ton
(74) *Attorney, Agent, or Firm* — Gifford, Krass, Sprinkle, Anderson & Citkowski, P.C.

(57) ABSTRACT

The present invention provides an automotive interior lamp assembly mounted to an automotive headliner further including a curtain side airbag mounted about the headliner. As the curtain side airbag quickly deploys and forces through the vehicle headliner, the lamp assembly can be forcibly detached from the headliner at a high rate of speed. The present invention provides an improved retainer to better attach the light assembly to the headliner thereby preventing detachment of the lamp assembly from the headliner. The lamp assembly includes a lamp housing having a lamp receiving configured to accept a lamp. The housing further includes a retainer receiving side configured to accept a retainer. The retainer attached to the housing by means of a plurality of attachment members provided on the retainer, and at least one snap member also provided on the retainer. The housing has a plurality of attachment member receiving cavities and at least one snap member receiving cavity. The retainer configured to slidably connect to the lamp housing. The retainer comprised of a generally U-shaped mid-section and at least one extended member sufficiently extending over the headliner as to prevent accidental dislodgment of the lamp assembly. As the curtain side airbag deploys, the extended side members of the retainer prevent dislodgment of the lamp assembly from the headliner.

10 Claims, 4 Drawing Sheets

LAMP RETAINER FOR CURTAIN SIDE AIRBAG DEPLOYMENT

FIELD OF THE INVENTION

The present invention relates to vehicle lighting assemblies and, in particular, vehicle lighting assemblies configured to remain attached to a vehicle headliner during curtain side airbag deployment.

BACKGROUND OF THE INVENTION

Curtain side airbag systems are commonly known and used. Curtain side airbags may be positioned in various locations within the passenger compartment of a vehicle. For instance, it is known to place a curtain side airbag in the headliner of a vehicle so as to protect the head of the occupant during an accident. The curtain side airbag displaces a portion of the headliner, or trim panel, and deploys into the vehicle passenger area to protect the head of the passenger.

It is commonly known to mount trim components, such as a lamp assembly, onto a trim panel, such as a headliner. However, the lamp assembly can become detached from the headliner during curtain side airbag deployment. As the curtain side airbag quickly deploys and forces through the vehicle headliner, the lamp assembly can be detached from the headliner. Accordingly, it is known to provide small brackets to the lamp assembly so as to retain the vent assembly to the trim panel or headliner. However, these known retention methods are not always suitable, especially as curtain side airbags become more powerful. Accordingly, it is desirable to have a lamp assembly having a retainer apparatus mounted on a lamp housing that retains the lamp assembly to a headliner during curtain side airbag deployment.

SUMMARY OF THE INVENTION

The present invention provides an automotive interior lamp assembly mounted to an automotive headliner further including a curtain side airbag mounted about the headliner. As the curtain side airbag quickly deploys and forces through the vehicle headliner, the lamp assembly can be forcibly detached from the headliner at a high rate of speed. The present invention provides an improved retainer to better attach the light assembly to the headliner thereby preventing detachment of the lamp assembly from the headliner. The lamp assembly includes a lamp housing having a lamp receiving configured to accept a lamp. The housing further includes a retainer receiving side configured to accept a retainer. The retainer attached to the housing by means of a plurality of attachment members provided on the retainer, and at least one snap member also provided on the retainer. The housing has a plurality of attachment members receiving cavities and at least one snap member receiving cavity. The retainer configured to slidably connect to the lamp housing. The retainer comprised of a generally U-shaped mid-section and at least one extended member sufficiently extending over the headliner as to prevent accidental dislodgment of the lamp assembly. As the curtain side airbag deploys, the extended side members of the retainer prevent dislodgment of the lamp assembly from the headliner.

DETAILED DESCRIPTION OF THE INVENTION

The present invention provides an automotive interior lamp assembly mounted to an automotive headliner. The automotive interior lamp assembly includes a retainer attached to the automotive interior lamp assembly configured to prevent accidental dislodgement of the lamp assembly from the vehicle headliner.

Figure 1:
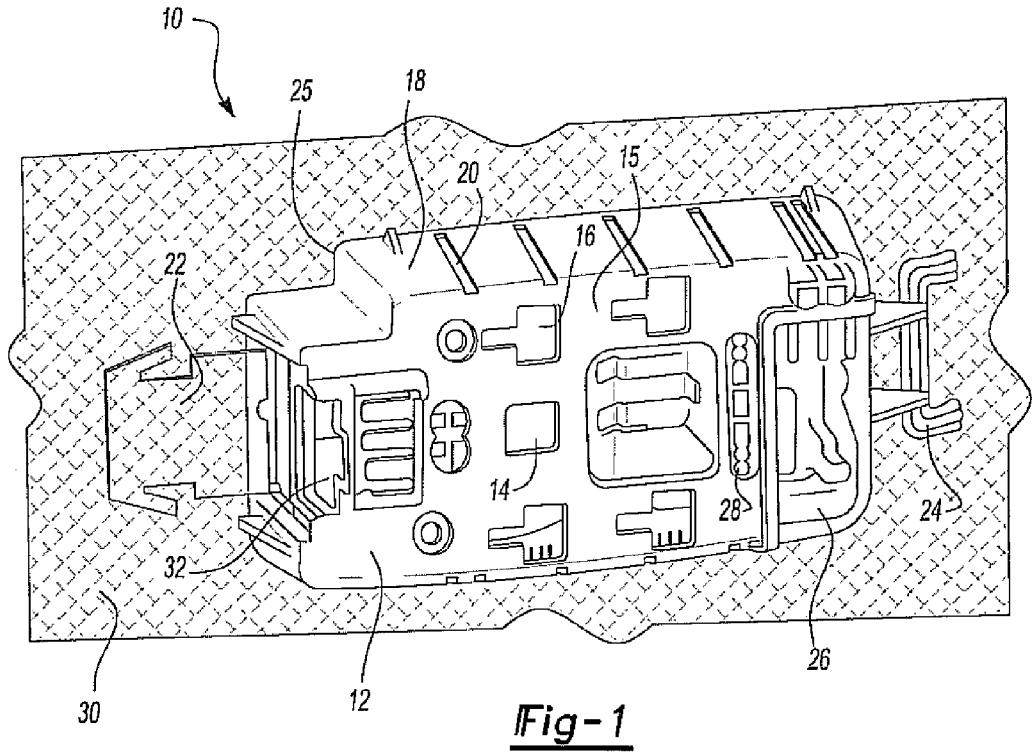
FIG. 1 is a perspective view of a lamp assembly mounted to a vehicle headliner.

FIG. 1 is a perspective view of a lamp assembly 10 mounted to a vehicle headliner 30. The automotive interior lamp assembly 10 includes a lamp housing 12 having a retainer receiving side 15 and a lamp receiving side 25. The lamp receiving side 25 is adapted to accept an automotive interior lamp. Such a lamp may be automatic, controlled by a switch, or other means of activation. The lamp housing 12 further includes a plurality of retention means to keep the lamp assembly 10 attached to the vehicle headliner 30 during CSA deployment.

It is commonly known to mount trim components, such as a lamp assembly 10, onto a trim panel, such as a headliner 30. However, the lamp assembly 10 can become detached from the headliner 30 during curtain side airbag deployment. As the curtain side airbag quickly deploys and forces through the vehicle headliner 30, the lamp assembly 10 can be detached from the headliner 30. Accordingly, it is known to provide retention means to the lamp assembly 10 so as to retain the lamp assembly 10 to the headliner 30. Accordingly, it is desirable to have a lamp assembly having a retainer apparatus mounted on a lamp housing that retains the lamp assembly to a headliner during curtain side airbag deployment.

The retention means of the present embodiment include the lens finger 22 and retention member 24. The lens finger 22 and the retention member 24 are adapted to keep the lamp assembly 10 securely attached to the vehicle headliner during CSA deployment. As the curtain side airbag quickly deploys and forces through the vehicle headliner 30, the lamp assembly 10 can be detached from the vehicle headliner 30. Although the lens finger 22 and the retention member 24 are designed to retain the lamp assembly 10 to the vehicle headliner 30, the lens finger 22 and the retention member 24 do not always sufficiently keep the lens assembly 10 attached to the vehicle headliner 30.

As shown in FIG. 1, the lamp housing 12 includes retainer receiving side 15. Retainer receiving side 15 is adapted to accept a stronger and more powerful retention means. Retainer receiving side 15 of housing 12 includes at least one snap member accepting cavity 14 adapted to accept a snap. Retainer receiving side 15 of lamp housing 12 further includes a plurality of attachment member accepting cavities 16. The snap member accepting cavity 14 and the attachment member accepting cavity 16 are adapted to accept the retainer 40, as shown in FIG. 2.

Figure 2:
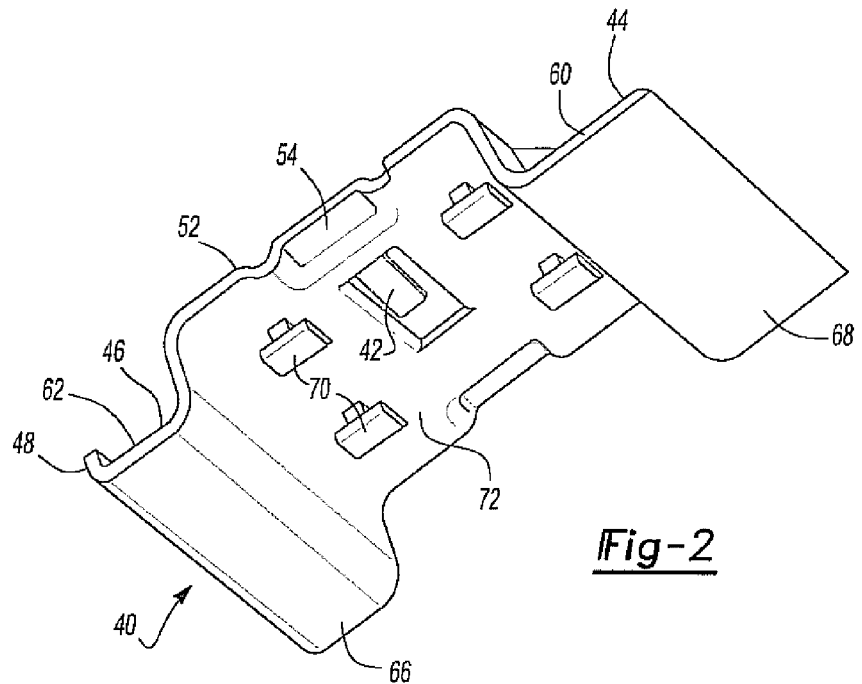
FIG. 2 is a perspective view of a retainer.

FIG. 2 is a perspective view of the retainer 40. Retainer 40 is shown having a generally U-shaped mid-section 52 and two extending side members 44 and 46. The extended side members 44, 46 may optionally include a lip 48 to better secure the lamp assembly 10 to the vehicle headliner 30. To secure the retainer 40 to the lamp housing 12, the retainer 40 has a snap member 42. Snap member 42 is adapted to connect to the snap member accepting cavity 14 as shown in FIG. 1. The retainer 40 further includes a plurality of attachment members 70 to also aid in attachment of the retainer 40 to the housing 12. Retainer 40 slidably attaches to the housing 12. The snap member 42 and the attachment members 70 connect with the snap member receiving cavity 14 and the attachment member receiving cavity 16, respectively, to ensure a secure fit and hold of the retainer 40 to the housing 12.

Retainer 40 is depicted having a generally U-shaped midsection 52 having extended side members 44, 46. Extended side member 44 further includes planar surface 68 winch comes into contact with headliner 30, or nearly comes into contact with headliner 30. The increased surface area of planar surface 68 ensures greater attachment and retention of the lamp assembly 10 to the vehicle headliner 30. Furthermore, extended side member 46 also includes a planar surface 66. Planar surface 66 comes into contact with the headliner 30, or nearly comes into contact with the headliner 30. Greater surface area of the planar surface 66 ensures a greater connection, attachment and retention of the lamp assembly 10 to the vehicle headliner 30. Use of the planar surfaces 66, 68 reduces the risk of accidental dislodgement of the lamp assembly 10.

The retainer 40 may optionally include at least one raised member 54. Raised members 54 are depicted from the underneath view and may optionally be included to better allow clearance of all housing 12 components. Raised members 54 may additionally allow the manufacturer to obtain a better grip on the retainer 40 to aid in installation and removal of the retainer 40 from the housing 12.

Figure 3:
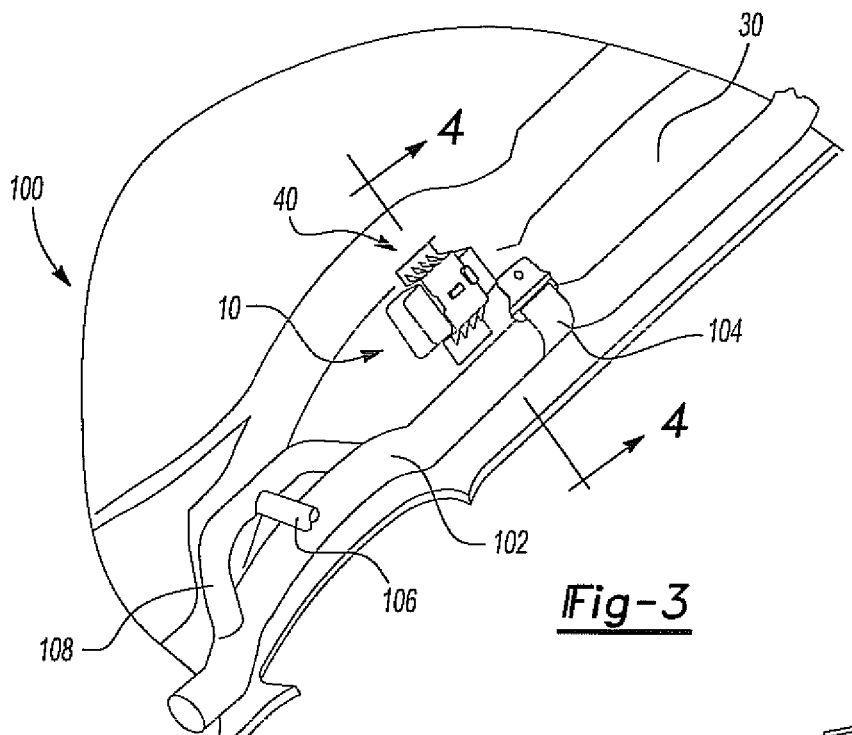
FIG. 3 is a perspective view showing a curtain side airbag placement in relation to a lamp assembly having a retainer mounted on a vehicle headliner.

FIG. 3 is a perspective view showing a curtain side airbag 102 placement in relation to the lamp assembly 10 having the retainer 40 mounted on the vehicle headliner 30. FIG. 3 drawing depicts the environment in which the lamp assembly 10 is mounted and where the retainer 40 is effective. The curtain side airbag 102 extend the length of the vehicle headliner 30. In the event of a collision, the curtain side airbag inflates by means of the inflator 106. Clips or bracket 104 may additionally be used to hold curtain side airbag 102 to the headliner 30. Upon inflation of the curtain side airbag 102, the retainer 40 retains the lamp assembly 10 to the vehicle headliner 30.

Figure 4:
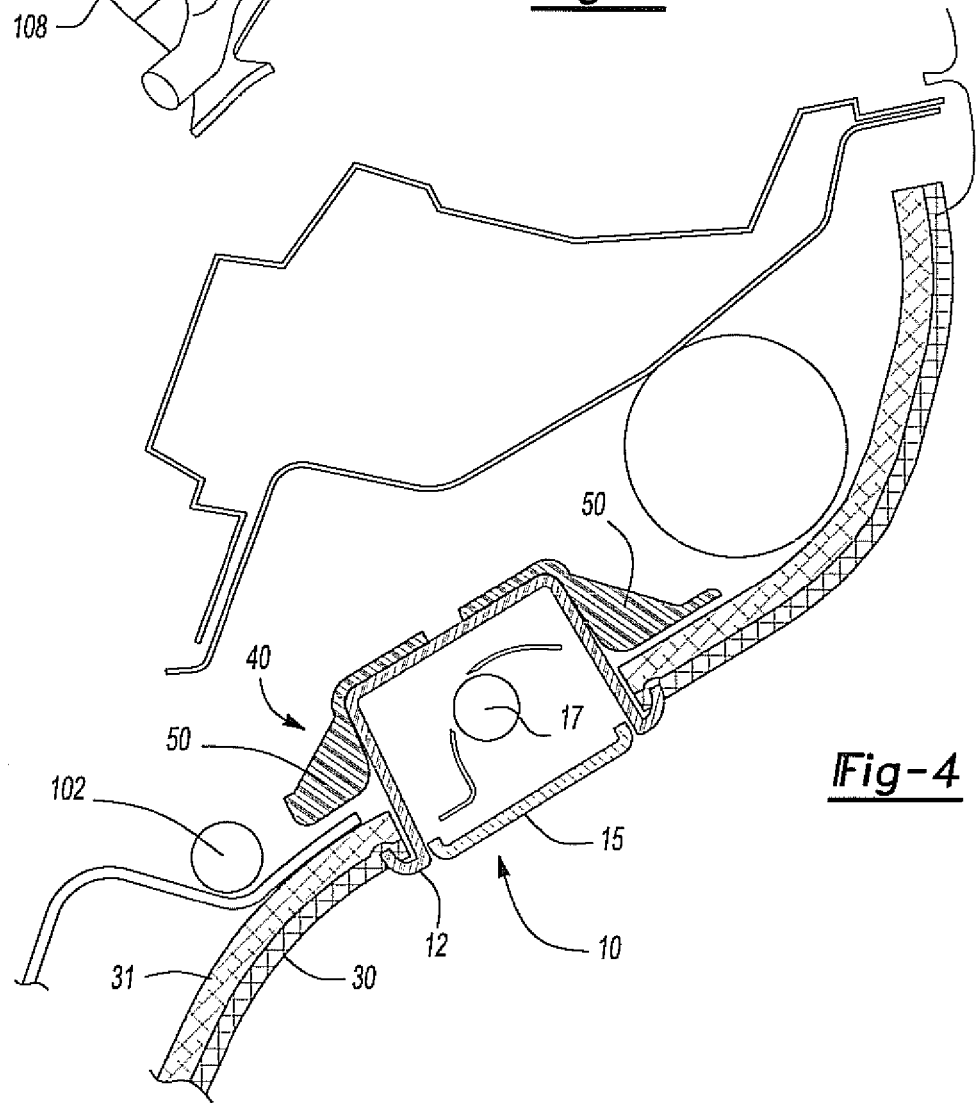
FIG. 4 is a cross sectional view of a lamp assembly with attached retainer mounted to a vehicle headliner.

FIG. 4 is a cross sectional view of the lamp assembly 10 with attached retainer 40 mounted to the vehicle headliner 30. This drawing depicts the environment in which the lamp assembly 10 is mounted and where the retainer 40 is effective. The curtain side airbag 102 extend the length of the vehicle headliner 30. The headliner 30 is additionally shown with headliner substrate 31 to further support the headliner 30 assembly. Additionally, the lamp assembly 10 is further shown having lamp lens 15 and light source 17. Upon inflation of the curtain side airbag 102, the retainer 40 retains the lamp assembly 10 to the vehicle headliner 30 by means of extended side members 44, 46 and support members 50.

Figure 5:
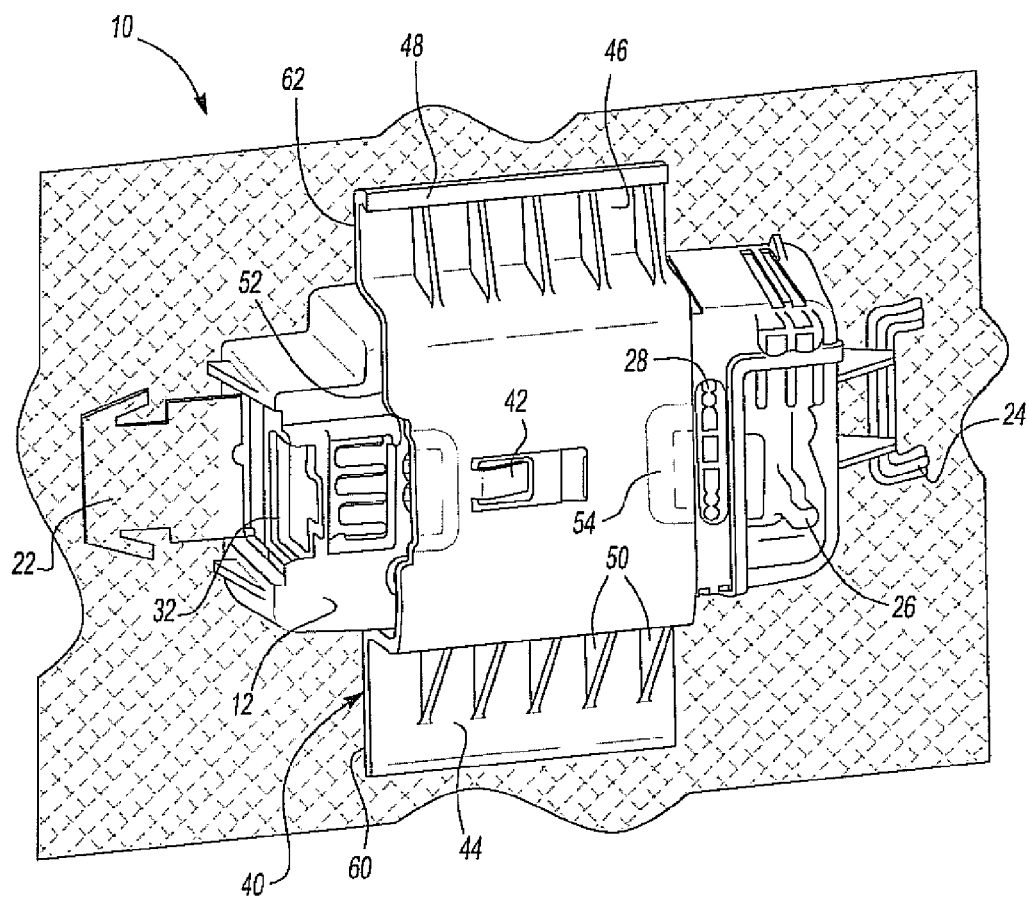
FIG. 5 is a perspective view of a lamp assembly with attached retainer mounted to a vehicle headliner.

FIG. 5 is a perspective view of the lamp assembly 10 with attached retainer 40 mounted to a vehicle headliner 30. The retainer 40 includes a generally U-shaped mid-section 52 and extended side members 44, 46. Extended side member 46 is shown with an optional lip 48 adapted to better retain the lamp housing 10 to the vehicle headliner 30. The lip 48 better retains the lamp housing 10 to the vehicle headliner 30 by preventing breakage of the retainer 40.

At least one extended side member 44, 46 of retainer 40 must extend sufficiently as to overlap the vehicle headliner 30 so as to prevent accidental detachment of the lamp housing 10 from the vehicle headliner 30. In this embodiment the retainer 40 is shown with extended side members 44, 46 both sufficiently extending as to overlap the vehicle headliner 30 so as to prevent accidental dislodgement of the lamp assembly 10 from the vehicle headliner 30. As the curtain side airbag 102 deploys, the extended side members 44, 46 of the retainer 40 prevent dislodgment of the lamp assembly 10 from the headliner 30.

Retainer 40 is depicted having a generally U-shaped midsection 52 having extended side members 44, 46. Extended side member 44 further includes planar surface 68 which comes into contact with headliner 30, or nearly comes into contact with headliner 30. The increased surface area of planar surface 68 ensures greater attachment and retention of the lamp assembly 10 to the vehicle headliner 30. Furthermore, extended side member 46 also includes a planar surface 66. Planar surface 66 comes into contact with the headliner 30, or nearly comes into contact with the headliner 30. Greater surface area of the planar surface 66 ensures a greater connection, attachment and retention of the lamp assembly 10 to the vehicle headliner 30. Use of the planar surfaces 66, 68 reduces the risk of accidental dislodgement of the lamp assembly 10.

Although attachment members 70 are depicted with a generally rectangular or T-shaped configuration, the attachment members 70 are not limited to this configuration. The retainer 40 and the lamp housing 12 are adapted so that the retainer 40 may slidably connect to the housing 12.

Additionally, the retainer 40 may optionally include a plurality of support members 50 to better strengthen the retainer 40. Since curtain side airbag assemblies are quickly becoming more powerful, the support members 50 act together with the retainer 40 to better hold the lamp assembly 10 to the vehicle headliner 30. Furthermore, support members 50 improve the overall strength of the retainer 40. The support members 50 thereby prevent breakage of the retainer 40.

Figure 6:
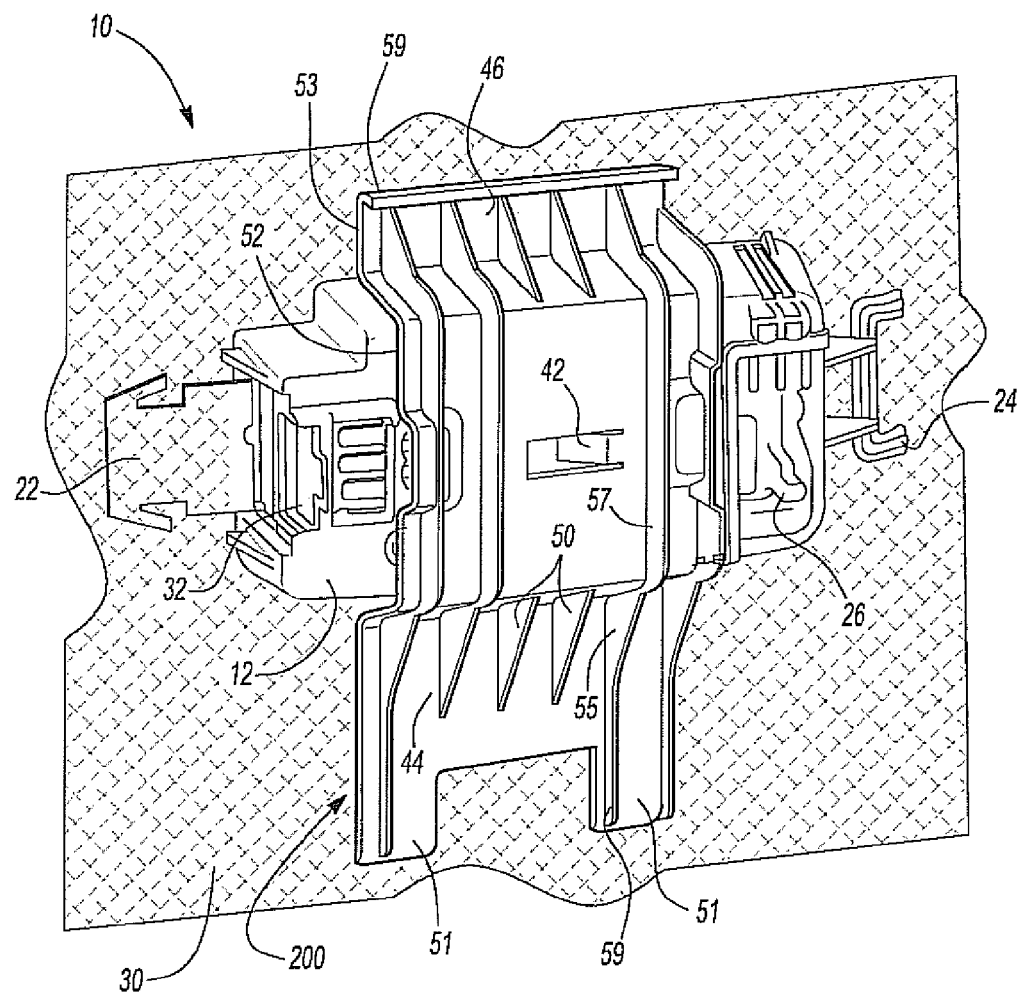
FIG. 6 is a perspective view of an alternative embodiment of a lamp assembly with attached retainer mounted to a vehicle headliner.

FIG. 6 is a perspective view of an alternative embodiment of the lamp assembly 10 with attached retainer 200 mounted to a vehicle headliner 30. The retainer 200 includes a generally U-shaped mid-section 52 and extended side members 44, 46. Extended side member 46 is shown with an optional lip 48 adapted to better retain the lamp housing 10 to the vehicle headliner 30. The lip 48 better retains the lamp housing 10 to the vehicle headliner 30 by preventing breakage of the retainer 200.

At least one extended side member 44, 46 of retainer 200 must extend sufficiently as to overlap the vehicle headliner 30 so as to prevent accidental detachment of the lamp housing 10 from the vehicle headliner 30. In this embodiment, extended side members 44, 46 of the retainer 200 have extensions 51 to further hold the lamp assembly 10 to the vehicle headliner 30. Furthermore, retainer 200 includes a plurality of support members 50. Support members 50 prevent breakage and in turn better hold the lamp housing 10 to the vehicle headliner 30. Some support members 50 have elongated ribs 57 which run across the top of the retainer 200. Furthermore, some support members 50 have elongated extension member ribs 59 which extend the length of the extension members 44, 46 and extensions 51. The elongated ribs 57 and the elongated extension member ribs 59 help support and prevent breakage of the retainer 200.

In this embodiment the retainer 200 is shown with extended side members 44, 46 and extensions 51 sufficiently extending as to overlap the vehicle headliner 30 so as to prevent accidental dislodgement of the lamp assembly 10 from the vehicle headliner 30. As the curtain side airbag 102 deploys, the extended side members 44, 46 and extensions 51 of the retainer 200 prevent dislodgment of the lamp assembly 10 from the headliner 30.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. An automotive interior lamp assembly adapted to mount to a headliner, the assembly comprising:
    a lamp housing mounted to the headliner, the headliner having an aperture for receiving the lamp housing, said lamp housing having a lamp receiving side and an outer retainer receiving side, said lamp receiving side configured to accept a lamp, said outer retainer receiving side having one of apertures or hooks;
    a retainer having the other of apertures or hooks to connect to the outer retainer receiving side of the lamp housing, the retainer extending over the outer retainer receiving side, the hooks interconnecting with the apertures to connect the retainer to the lamp housing;
    wherein said retainer has a mid-section connected to at least one extended side member, said retainer further including at least one extended side member, the at least one extended side member extending away from the mid-section of the retainer, the headliner having an interior surface and a back surface, the extended side member overlapping the back surface of the headliner.

2. The automotive interior lamp assembly of claim 1, wherein said retainer further includes a plurality of supporting members.

3. The automotive interior lamp assembly of claim 1, wherein said headliner includes an opening to accept said lamp housing.

4. The automotive interior lamp assembly of claim 1, wherein said mid-section of said retainer is generally U-shaped.

5. The automotive interior lamp assembly of claim 4, wherein said retainer slidably attaches to said lamp housing.

6. The automotive interior lamp assembly of claim 5, wherein said retainer further includes a snap member.

7. The automotive interior lamp assembly of claim 6, wherein said lamp housing includes a snap receiving cavity configured to accept said snap member.

8. The automotive interior lamp assembly of claim 5, wherein said retainer further includes at least one attachment member.

9. The automotive interior lamp assembly of claim 8, wherein said lamp housing includes at least one attachment member receiving cavity to accept said attachment member.

10. The automotive interior lamp assembly of claim 9, where said attachment member is T-shaped.

* * * * *